United States Patent Office 3,366,903
Patented Jan. 30, 1968

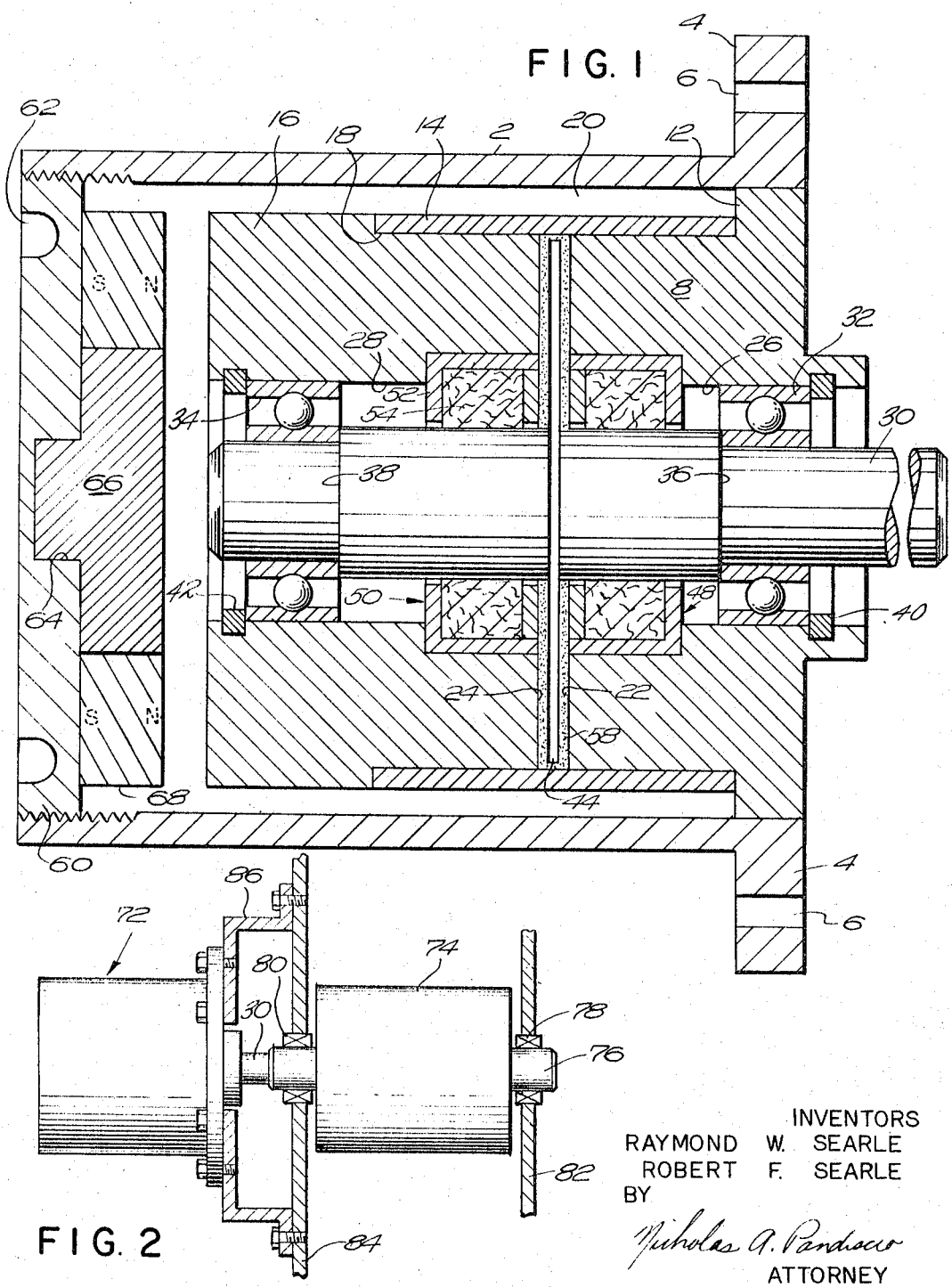

3,366,903
MAGNETIC TENSIONING DEVICE
Raymond W. Searle, Weston, Mass., and Robert F. Searle, Amherst, N.H., assignors to Vibrac Corporation, Chelmsford, Mass., a corporation of Massachusetts
Filed Dec. 6, 1965, Ser. No. 511,631
12 Claims. (Cl. 335—209)

This invention relates to magnetic devices and more particularly to a new and simple magnetic device for imparting torque resistance, i.e., drag, to a rotatable member.

Many different types of apparatus require braking devices for applying drag to a rotatable or pivotal member. Such devices are commonly called "tensioners" where, by retarding free rotation of a rotatable member such as a supply reel or a guide roll, they serve to maintain tension on a moving strand or web. By way of example but not limitation, tensioners have applications in tape recorders, film processing machines, and textile machinery. State of the art tensioners are of many types. Some are fully mechanical in nature, employing elements such as Neg'ator® springs for torque; others embody solenoids. Fully mechanical devices are not always convenient to use and precision control with reliability is not always easy to achieve. Tensioners using solenoids require a power source and involve wiring. Other liimtations of conventional tensioners, such as inability to provide an even low level torque, are well known to persons skilled in the art.

Accordingly the primary object of the present invention is to provide a new and simple device for imparting drag to a rotatable member.

Another object of the invention is to provide a new and improved tensioner device embodying magnetic means for imparting drag to a rotatable member.

A further object of the invention is to provide a new adjustable magnetic brake which is adapted to apply a selective amount of drag to a rotatable member.

A more specific object of the invention is to provide a new and improved magnetic tensioner comprising two bearing supports, a rotatable shaft journaled in the two bearing supports and provided with a magnetic disc interposed between the two bearing supports, means containing a predetermined supply of a magnetic medium in powder form on opposite sides of the disc between the two bearing supports, a permanent magnet movable toward and away from the two bearing supports so as to vary the influence of the magnets' field on the magnetic disc, and means for providing a closed magnetic circuit between the magnet on the one hand and the two rotor supports and the magnetic discs on the other hand so that the disc and shaft are restrained against rotation by the influence of said magnet.

Other objects and many of the attendant advantages will be better understood from reference to the following detailed specification which is to be considered together with the drawings wherein:

FIG. 1 is a longitudinal sectional view of a preferred form of tensioning device embodying the present invention; and FIG. 2 is an elevational view, partially in section, of apparatus embodying the device of FIG. 1.

Turning now to FIG. 1, the illustrated apparatus comprises a cylindrical case 2 which is formed with open ends. Preferably, but not necessarily, the case is provided with a radially extending flange 4 whereby it can be attached to a suitable supporting structure. Holes 6 are provided in flange 4 to facilitate bolting the case to the supporting structure. An annular rotor support 8 is secured within the case 2 at the same end as the flange 4.

The rotor support is sized so as to leave an air gap between it and the case 2 except at its outer end which has a radially extending flange 12 which is secured to the case 2 in a suitable manner, e.g., by brazing or by a friction fit. Secured to rotor support 8 is a cylindrical sleeve 14. The function of sleeve 14 is two fold. One function is to rigidly support a second rotor support 16. The exterior surface of the latter is undercut as shown at 18 to accommodate sleeve 14. The two rotor supports are secured to sleeve 14 by brazing or some other suitable means so as to form a single integral structure which, except for flange 12, is spaced from case 2 by a uniform annular air gap 20. The second function of sleeve 14 is to enclose the space between the two confronting faces 22 and 24 of the two rotor supports, the two confronting faces being spaced from each other a short predetermined distance. The two rotor supports have aligned center bores 26 and 28 within which a shaft 30 is rotatably supported. Shaft 30 is maintained within the axial bores by suitable ball bearing members of conventional design illustrated at 32 and 34. The shaft is undercut to provide shoulders 36 and 38 which are engaged by the inner races of bearing members 32 and 34 respectively. The two supports 8 and 16 are provided with appropriate grooves to accommodate snap rings 40 and 42 that engage the outer races of the two bearing members. The snap rings captivate the bearing members and in coaction therewith prevent the shaft from moving axially while permitting it to rotate relative to the two rotor members.

The shaft 30 is part of a rotor assembly which also comprises a disc 44. The latter is formed separately of the shaft and is secured to it in a suitable manner, e.g. by brazing. Disc 44 extends radially into the space between the two confronting faces of the two supports 8 and 16 but terminates short of sleeve 14 so as to permit the shaft to rotate freely without binding.

The two rotor supports also carry two circular seal assemblies, identified generally as 48 and 50, located on opposite sides of the disc. Each seal assembly consists of a metal ring 52 of U-shaped cross-section that serves to contain a suitable resilient material 54 consisting of impregnated fiber, rubber, or plastic. These seal assemblies are received in suitable grooves formed in the inner side of the two rotor supports and are maintained in place by brazing or cementing rings 52 to the rotor supports. The rings 52 terminate short of the shaft and the sealing is accomplished by engagement of the resilient material 54 with the shaft.

The two seal assemblies effectively close off the space between the two rotor supports adjacent to shaft 30 while allowing the latter to rotate. The amount of drag imposed on shaft 30 by the two seals is relatively light and, for the purposes of this invention, almost negligible. Contained within the chamber defined by the two rotor supports, sleeve 14, shaft 30 and the two seals, is a magnetic medium in the form of a supply of fine magnetic powder 58. This powder preferably consists of iron powder. However, the powder may consist of other magnetic materials such as an iron-silicon alloy or a magnetic stainless steel. It is contemplated also to use a viscous magnetic fluid in the form of a magnetic powder suspended in an inert fluid. The powder is disposed on opposite sides of disc 44 and loosely fills the chamber.

The opposite end of the case 2 is closed off by an end plate 60. For this purpose the opposite end of the case 2 is provided with an interior thread and the peripheral surface of the end plate is provided with a mating thread. This permits the end plate to be screwed into and out of the case 2 to the extent permitted by the thread on case 2. At this point it should be noted that end plate 60 is provided with suitable holes 62 to accommodate a spanner wrench that facilitates adjustment of the position of the end plate with respect to the rotor support 16.

The end plate 60 is provided with a cavity 64 into which is force fitted a non-magnetic plug 66. The latter serves as the core for an annular axially polarized permanent magnet 68. In the illustrated embodiment magnet 68 is polarized so that the end adjacent to rotor support 16 is its north pole while the end adjacent to the end plate 60 is its south pole. However it is to be appreciated that the magnet may be mounted in reverse so that its south pole is nearest to rotor support 16.

The case 2 preferably is made of magnetic silicon steel, as are the rotor supports 8 and 16 and end plate 60. The shaft 30 is made of a suitable stainless steel composition that is non-magnetic. The disc 40 preferably is made of magnetic silicon steel. The sleeve 14 is made of an appropriate non-magnetic material such as 300 series stainless steel. Preferably the non-magnetic plug 66 is made of stainless steel or an epoxy resin. The rings 52 of the two seal assemblies preferably are made of brass or some other non-magnetic metal.

In a device of the character just described, a closed magnetic circuit is completed for magnet 68, the circuit comprising end plate 60, case 2, rotor support 8, the powder 58, disc 44, rotor support 16 and the air gap between rotor 16 and the magnet. The magnet particles line up along the lines of flux between the rotor supports and disc 44. The magnetic field channeled through the rotor supports 8 and 16 converts the supply of magnetic particles from a free flowing state to a more or less viscous mass which adheres to both rotor supports and disc 44. This change in the freedom of movement of the magnetic particles is reflected by a resistance to rotational movement of disc 44 relative to the two stationary rotor supports. It appears that slippage occurs due to shearing of the mass of powder rather than by movement of the powder particles relative to the rotor disc and the rotor supports. The particles immediately adjacent to the rotor supports and the rotor disc are held against movement relative to these elements and shearing occurs generally at the center of each particle cavity, i.e., about midway between each rotor support and disc 44. This is confirmed by little or no wear of the faces of the rotor disc and the rotor supports.

The drag imparted to shaft 30 by the influence of the magnetic field is dependent upon the strength of the magnet and also the gap between magnet 68 and the adjacent rotor support 16. Increasing or decreasing the gap between the magnet and the rotor support 16 varies the reluctance of the magnetic circuit and thereby effects the amount of drag imparted to disc 44 by the magnetic particles. More specifically, if the end plate 60 is rotated in a direction to move the magnet 68 further away from the rotor support 16, the influence exerted by the magnetic field on the magnetic particles 58 is diminished and the shaft can rotate more freely. Moving the magnet 68 in the opposite direction so as to minimize the gap between it and the rotor support 16 serves to increase the drag on the shaft 24.

The magnetic device just described has many applications. A typical application is illustrated in FIG. 2 where the device of FIG. 1 is identified generally by the numeral 72. The apparatus of FIG. 2 includes a tension guide roll 74 which forms part of a machine embodying a web transporting system (not shown). Roll 74 is secured to a shaft 76 whose ends are journaled in suitable roller bearings 78 and 80 carried by stationary side plates 82 and 84. Shart 76 protrudes beyond the bearing 80 and is keyed to shaft 30 of the magnetic tensioner. The latter is bolted to a suitable bracket 86 secured to side plate 84. In practice a web (not shown) passes over the tension guide roll. Typically the tension guide roll is disposed between a web supply reel and one or more pairs of web driving rolls. The guide roll 74 tends to accelerate freely under the urging of the moving web but is prevented from doing so by the restraining torque of tensioner 72, as a result of which the web is held under tension as it is pulled by the drive rolls. The loading effect of the tensioner on guide roll 74 can be varied as desired by moving its end plate 60 in the manner described above.

Of course the arrangement of FIG. 2 is merely illustrative of the possible applications to which the tensioner of FIG. 1 can be put. Other applications are obvious to persons skilled in the art.

The advantages of the tensioner of FIG. 1 are several. First and foremost is the simplicity and compactness of the unit. A further advantage resides in the fact that the amount of drag which can be exerted by the unit can be varied by adjusting the gap between the magnet carried by the end plate and the adjacent rotor support. It also is possible to use a greater or less powerful magnet to alter the torque limits of the device. Still another advantage resides in the fact that the tensioner is always "on" and no exterior electrical supply is needed in order to render it operative. This makes the unit extremely reliable. It is to be noted also that the arrangement of parts is such that a very efficient magnetic circuit is provided, thereby minimizing the size of the magnet required to yield a suitable range of drag on the output shaft 24. Additionally the device may be made in various sizes without departing from the principle of the invention. Perhaps the most important advantage is that the torgue resistance offered by the device remains substantially constant during continuous use, regardless of the level at which it is set. Pulsative and sinusoidal variations are subtantially absent from the tensioner's output. By way of example, a unit constructed as above described with an overall case diameter of 1½" and designed to provide a torque range of 2–32 ounce-inches will show no more than about 0.2 ounce-inch variation in torque resistance at any setting in the aforesaid range.

Of couse the invention is not limited to the specific construction illustrated in FIG. 1 and described in the foregoing specification. For one thing, other materials may be used in place of those specified above. Thus, for example, the case 2 need not be made of silicon steel but may be made of some other magnetic alloy. Alternatively the case 2 could be made of a plastic loaded with magnetic powder. It is contemplated also that the unit may be made with shaft 30 long enough to project from both ends of the case. For this modification end plate 60 and plug 66 would be provided with apertures at their centers to accommodate shaft 30. With this alternative construction, both ends of shaft 30 could be connected to rotatable members such as tension guide rolls 74, with the tensioner case secured to a stationary support by way of its flange 4. It is contemplated also that in certain applications the tensioner need not be as in FIG. 2 secured to a stationary support but could be mounted for rotational movement of its case. Thus the tensioner could serve as a slip clutch, with its case connected to a rotatable input member such as a shaft or gear and its shaft 30 connected to drive a rotatable output member. Still other changes and applications will be obvious to persons skilled in the art.

Accordingly, it is to be understood that the invention is not limited in its application to the details of construction and arrangements of parts specifically described or illustrated, and that within the scope of the appended claims, it may be practiced otherwise than as specifically described or illustrated.

We claim:

1. Apparatus comprising a hollow magnetic case, a first magnetic rotor support secured in said case, a second magnetic rotor support disposed in said case, means securing said second rotor support in spaced end to end relation with said first rotor support, a rotor comprising a shaft rotatably supported by said supports and a magnetic disc mounted on and rotatable with said shaft, means cooperating with said supports and said shaft to define a chamber between the ends of said supports, said disc extending into said chamber, a supply of magnetic powder in said chamber, a magnet with discrete north and south poles, means adjustably positioning said magnet within said case, said magnet oriented with one pole adjacent to said second support and the other pole remote from said second support, said case and rotor supports cooperating with said disc and powder to provide a magnetic circuit for the field of said magnet so that rotation of said shaft relative to said supports is retarded by the influence of said field on said powder and disc.

2. Apparatus comprising a case, a first annular rotor support secured in said case, a second annular rotor support, means securing said second rotor support to said first rotor support in spaced end to end relation therewith, a rotor comprising a shaft rotatably secured to said supports and a radially extending magnetic disc on said shaft, said disc extending radially into the space between said supports, a supply of magnetic powder contained in said space with said disc, and an annular permanent magnet supported in said case in tandem with said rotor supports, said magnet having axially distributed poles, said case together with said rotor supports providing a magnetic circuit through said powder and disc for the field of said magnet so that rotation of said rotor is restrained by the influence of said field on said powder and disc.

3. Apparatus as defined by claim 2 wherein said magnet is movable toward and away from said supports so as to vary the influence of said field on said disc.

4. Apparatus as defined by claim 2 wherein said magnet is mounted on a member which screws into and out of said case.

5. Apparatus as defined by claim 3 further including means on said case for attaching it to a supporting structure.

6. Apparatus comprising first and second axially aligned magnetic rotor supports disposed so as to provide a gap therebetween, a rotor comprising a shaft with a magnetic rotor disc, said shaft rotatably mounted in said supports with said disc extending into said gap, a supply of magnetic powder disposed in said gap, means preventing escape of powder from said gap, a permanent magnet adjustably positioned in tandem with said supports, said magnet polarized so that its field is aligned with said supports and said disc, and means completing a magnetic circuit for said magnet through said supports, said powder and said disc so that rotation of said shaft is impeded by the magnetic attraction between said supports and powder on the one hand and said powder and disc on the other hand.

7. Apparatus as defined by claim 6 wherein said magnet is an annular member mounted in concentric relation to said shaft.

8. Apparatus as defined by claim 7 wherein the inner diameter of said magnet is greater than the outer diameter of said shaft.

9. Apparatus as defined by claim 8 wherein said first rotor support includes a radially extending flange, and further wherein said last mentioned means for completing said magnetic circuit includes a member attached to said flange but spaced from said second rotor support and said disc.

10. Apparatus as defined by claim 9 further including magnetic means providing a direct coupling between said magnet and said member.

11. Apparatus comprising a hollow case, a first magnetic member secured in said case, a second magnetic member disposed in said case, means securing said second magnetic member in spaced end to end relation with said first magnetic member, a rotor comprising a shaft rotatably supported by at least one of said first and second magnetic members and a magnetic disc mounted on and rotatable with said shaft, means cooperating with said first and second magnetic members and said disc to define a chamber between the ends of said first and second magnetic members, said disc extending into said chamber, a supply of magnetic powder in said chamber, a permanent magnet with discrete north and south poles, means adjustably positioning said magnet within said case, said magnet oriented with one pole adjacent to said second magnetic member and the other pole remote from said second magnetic member, said case and said first and second magnetic members cooperating with said disc and powder to provide a magnetic circuit for the field of said magnet so that rotation of said shaft is retarded by the influence of said field on said powder and disc.

12. Apparatus comprising first and second axially aligned magnetic members disposed so as to provide a gap therebetween, a rotor comprising a shaft with a magnetic rotor disc, said shaft rotatably mounted in at least one of said magnetic members with said disc extending into said gap, a supply of powder disposed in said gap, means preventing escape of powder from said gap, a permanent magnet adjustably positioned in tandem with said magnetic members, said magnet polarized so that its field is aligned with said magnetic members and said disc, and means completing a magnetic circuit for said magnet through said magnetic members, said powder and said disc so that rotation of said shaft is impeded by the magnetic attraction between said magnetic members and powder on the one hand and said powder and disc on the other hand.

References Cited

UNITED STATES PATENTS

| | | | |
|---|---|---|---|
| 2,622,707 | 12/1952 | Faus | 310—93 X |
| 2,685,947 | 8/1954 | Votran | 188—90 |
| 3,076,934 | 2/1963 | Witte et al. | 324—152 |

BERNARD A. GILHEANY, *Primary Examiner.*

GEORGE HARRIS, *Examiner.*